(12) United States Patent
Bae

(10) Patent No.: US 11,574,049 B2
(45) Date of Patent: Feb. 7, 2023

(54) SECURITY SYSTEM AND METHOD FOR SOFTWARE TO BE INPUT TO A CLOSED INTERNAL NETWORK

(71) Applicant: SOFTCAMP CO., LTD., Gyeonggi-do (KR)

(72) Inventor: Hwan-Kuk Bae, Gyeonggi-do (KR)

(73) Assignee: SOFTCAMP CO., LTD., Gyeonggi-do (KR)

( * ) Notice: Subject to any disclaimer, the term of this patent is extended or adjusted under 35 U.S.C. 154(b) by 73 days.

(21) Appl. No.: 17/205,560

(22) Filed: Mar. 18, 2021

(65) Prior Publication Data

US 2021/0319096 A1 Oct. 14, 2021

(30) Foreign Application Priority Data

Apr. 8, 2020 (KR) .................. 10-2020-0042669

(51) Int. Cl.
*G06F 21/55* (2013.01)
*G06F 21/54* (2013.01)
*G06F 21/60* (2013.01)
*G06F 21/56* (2013.01)

(52) U.S. Cl.
CPC ............ *G06F 21/554* (2013.01); *G06F 21/54* (2013.01); *G06F 21/564* (2013.01); *G06F 21/565* (2013.01); *G06F 21/602* (2013.01)

(58) Field of Classification Search
CPC .......... G06F 21/44; G06F 21/50; G06F 21/51; G06F 21/54; G06F 21/55–554; G06F 21/56–568; G06F 21/60–604; G06F 21/78; H04L 63/10; H04L 63/20
See application file for complete search history.

(56) References Cited

U.S. PATENT DOCUMENTS

| | | | |
|---|---|---|---|
| 2009/0222907 A1* | 9/2009 | Guichard ............ | H04L 63/1408 726/17 |
| 2014/0215220 A1* | 7/2014 | Kim .................... | G06F 21/6272 713/176 |
| 2017/0300689 A1* | 10/2017 | Phanse ................. | H04W 12/08 |

FOREIGN PATENT DOCUMENTS

| | | |
|---|---|---|
| KR | 1019990015243 | 3/1999 |
| KR | 1020000037571 | 7/2000 |
| KR | 1020000050234 | 8/2000 |
| KR | 1020020031500 | 5/2002 |

* cited by examiner

*Primary Examiner* — Kevin Bechtel
(74) *Attorney, Agent, or Firm* — IPLA P.A.

(57) ABSTRACT

A security system for software to be input to a closed internal network includes: a kiosk including a registration module configured to read the stored software of a connected portable storage medium, a vaccine module configured to detect malicious code in the software, and an authentication module configured to set inspection authentication for the portable storage medium whose software has been inspected for malicious code; and a client including a check module configured to check the portable storage medium for inspection authentication and authorize the execution of the stored software.

8 Claims, 6 Drawing Sheets

SECURITY SYSTEM AND METHOD FOR SOFTWARE TO BE INPUT TO A CLOSED INTERNAL NETWORK

CROSS-REFERENCE

This application claims the benefit of Korean Patent Application No. 10-2020-0042669 filed on 8 Apr. 2020, which is hereby incorporated by reference herein in its entirety.

BACKGROUND

The present invention relates to a SECURITY SYSTEM AND METHOD FOR SOFTWARE TO BE INPUT TO A CLOSED INTERNAL NETWORK, which block the input and installation of software infected with malicious code to and in an internal network through an external network, thereby establishing a safe security environment for the internal network.

Government offices of government agencies, local governments, etc. and various enterprises and research institutes that require security (hereinafter referred to as the "security group") have built closed internal networks that are blocked from external networks such as the Internet in order to prevent the unauthorized leakage of their own data and to protect the constituent PCs and server of the security group.

Advanced security technology blocks direct penetration into an internal network through an external network, and thus existing malicious code technology has limitations in terms of the attack on the internal network. Due to this, unauthorized data leakage from internal networks and the infection rate of internal networks have significantly decreased.

However, with the development of security technology, hacking technology and infection routes are diversified, and thus attacks on software developers having relatively weak security have increased. Software developers develop software such as source codes and programs, update files, and patches to be installed in internal networks, and input the software to the internal networks according to designated paths.

In a communication environment between a software developer and an internal network, a hacker penetrates the network of the software developer, and modifies software to be transmitted to the internal network or inserts new software for malicious purposes, or a hacker accesses a separate server distributing software and changes software to be installed on the internal network. For reference, typical attack methods include the alteration of build/update infrastructure, alteration through the leakage of a certificate or development account, the alteration of hardware or firmware, and the sales of an online product infected with malicious code.

The software of the software developer infected and altered (hereinafter referred to as "infected") by the hacker is installed on the server and PCs of the internal network, and then leaks the data of the internal network without permission or damages the server so that it cannot perform its functions.

As a result, there is an urgent need for security technology that can completely block the online connection between an internal network and an external network and neutralize the malicious code of software to be input to the internal network, thereby establishing a safe software installation environment.

Prior art document 1: Korean Patent Application Publication No. 10-2002-0031500 (published on Feb. 5, 2002)

SUMMARY OF THE INVENTION

The present invention has been conceived to overcome the above-described problems, and an object of the present invention is to provide a security system and method for software to be input to a closed internal network, which increase the security of an internal network by blocking communication between the internal network and an external network and fundamentally block infection with malicious code that occurs in the process of installing and updating software in the internal network.

In order to accomplish the above object, the present invention provides a security system for software to be input to a closed internal network, the security system including:

a kiosk including a registration module configured to read the stored software of a connected portable storage medium, a vaccine module configured to detect malicious code in the software, and an authentication module configured to set inspection authentication for the portable storage medium whose software has been inspected for malicious code; and a client including a check module configured to check the portable storage medium for inspection authentication and authorize the execution of the stored software.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE INVENTION

Figure 1:
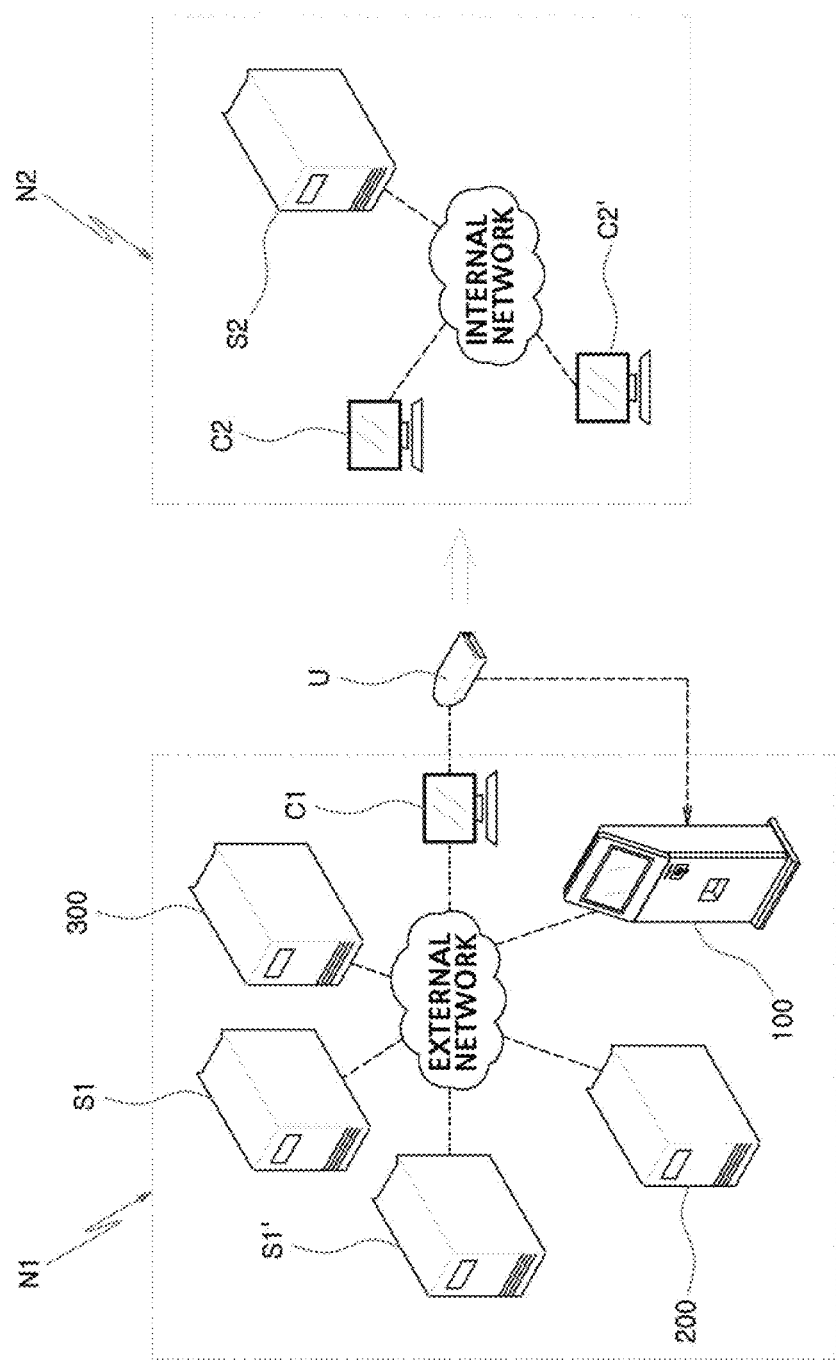
FIG. 1 is a diagram schematically showing a communication relationship between an external network, including the kiosk of a security system for software to be input, and an internal network according to the present invention.

The features and effects of the present invention described above will become apparent through the following detailed description given in connection with the accompanying drawings, and accordingly, those of ordinary skill in the art to which the present invention pertains can easily implement the technical spirit of the present invention. Since the present invention may be subject to various modifications and have various forms, specific embodiments will be illustrated in the drawings and described in detail in the text. However, this is not intended to limit the present invention to the specific forms disclosed, but the present invention should be understood as including all modifications, equivalents, and substitutes included in the spirit and scope of the present invention. The terms used herein are only used to describe specific embodiments, and are not intended to limit the present invention.

The specific details of the present invention will be described in detail below with reference to the accompanying drawings.

Figure 2:
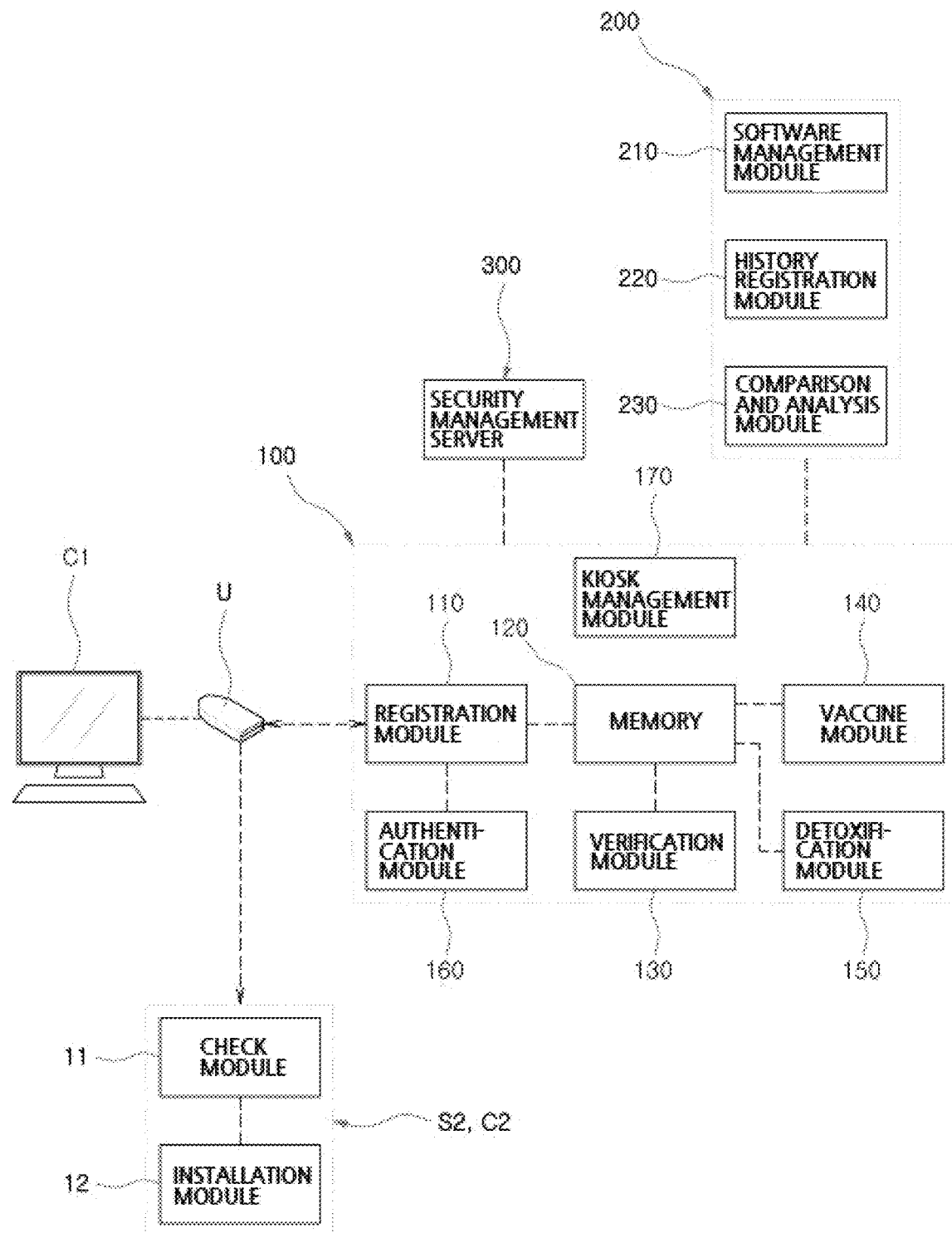
FIG. 2 is a block diagram showing the configurations of the kiosk, cloud device, and internal network client of the security system for software to be input according to the present invention.

FIG. 1 is a diagram schematically showing a communication relationship between an external network, including the kiosk of a security system for software to be input, and an internal network according to the present invention, and FIG. 2 is a block diagram showing the configurations of the kiosk, cloud device, and internal network client of the security system for software to be input according to the present invention.

Referring to FIGS. 1 and 2, the security system according to the present embodiment has a communication function that can transfer data to an internal network N2 while separating the internal network N2, which is the internal communication network of a security group, from an external network N1, which is a general communication network such as the Internet. To this end, the security system according to the present embodiment includes a kiosk 100 configured to inspect/disinfect the software (e.g., source code, a program, an update file, a patch, etc.) of the external network N1 for malicious code for the purpose of data communication between the internal network N2 and the external network N1 and store the software in an authenticated portable storage medium U. For reference, the portable storage medium U may be a storage means such as USB memory, or a computer system such as a laptop computer or desktop computer.

The portable storage medium U registered and inspected/disinfected for malicious code in the kiosk 100 is connected to the client C2 or C2' or server S2 of the internal network N2 in a hardware fashion, and the software stored in the portable storage medium U is installed on the client C2 or C2' or server S2.

As a result, the software of the client C1 or server S1 or S1' communicating within the external network N1 is registered and inspected/disinfected for malicious code in the kiosk 100, and the inspected software connects to the internal network N2 over the offline connection of the portable storage medium U by the user.

To this end, the kiosk 100 according to the present embodiment includes: a registration module 110 configured to read the stored software of the connected portable storage medium U and register a system image (an installation image); a vaccine module 140 configured to detect malicious code in the software; and an authentication module 160 configured to set inspection authentication for the portable storage medium U whose software has been inspected for malicious code. In addition, the client C2 of the closed internal network N2 separated from the external network N1 includes a check module 11 configured to check the portable storage medium U for inspection authentication and authorize the execution of the stored software. For reference, the object to which the portable storage medium U connects in the internal network N2 may be the server S2 other than the client C2, but in the detailed description and claims of the present embodiment, it is collectively referred to as the client C2. Accordingly, the connection target of the portable storage medium U is not limited to the client C2, but should be expanded to and interpreted as the server S2 of the internal network N2.

The portable storage medium U is illustrated as USB memory in FIGS. 1 and 2, but is not limited thereto. A disk, such as a compact disk (CD) or a digital versatile disk (DVD), and a medium having a storage function, such as an SD memory card, should be expanded to and interpreted as the portable storage medium U.

The registration module 110 connects to the portable storage medium U in a hardware fashion, reads the software stored in the portable storage medium U, and stores it in the memory 120 of the kiosk 100. In addition, the system image of the portable storage medium U, i.e., a disk image via a snapshot, is generated, is stored in the memory 120, and is transmitted to the client C2 or S2.

The vaccine module 140 detects malicious code in the software stored in the memory 120. Furthermore, it deletes or neutralizes the malicious code with which the software is infected. The vaccine module 140 may be exemplified by conventional vaccine application software such as V3®, HAURI®, and Bitdefender®, and it is preferable to provide two or more different types of vaccine application software. Accordingly, the vaccine module 140 according to the present embodiment is configured such that two or more types of vaccine application software are configured to disinfect the corresponding software, thereby increasing the reliability of protection against malicious code. In addition, the vaccine module 140 may check whether a program for the processing of the kiosk 100 or the like is infected with malicious code, may detect malicious code, and may disinfect the program or the like.

Meanwhile, the update and the like of the vaccine module 140 may be managed by the security management server 300 of the corresponding vaccine application software.

The kiosk 100 according to the present embodiment communicates with the security management server 300 and other management center servers (not shown) over the external network N1. However, since the excessive communication of the kiosk 100 over the external network causes the infection of the kiosk 100 with malicious code, the kiosk 100 communicates with the designated security management server 300 through interfacing using a virtual private network (VPN) method. In this case, the kiosk 100 connects to a VPN-type communication network only at a designated time and connects to the security management server 300, and the security management server 300 transmits update information for the security of the kiosk 100.

Accordingly, the vaccine module 140 according to the present embodiment connects to the security management server 300 by executing the VPN communication device (not shown) only at a designated time, and the security management server 300 checks the connection of the vaccine module 140 and transmits update information. The vaccine module 140 having received the update information makes an update according to a setting process and blocks the communication of the VPN communication device.

For reference, the VPN communication device and the kiosk 100 may perform wired or wireless network communication, and the kiosk 100 according to the present embodiment wirelessly communicates with the VPN communication device through the relay of an LTE base station.

The authentication module 160 sets inspection authentication for the portable storage medium U whose software has been inspected for malicious code. The software is inspected for malicious code/disinfected by the vaccine module 140 through various methods such as software verification and detoxification via recombination as well as the above-described disinfection method. Accordingly, when the inspection/disinfection of the software for malicious code has been completed, an inspection authentication code for verifying the safety of the software is set. The inspection authentication may be set for the software itself or for the portable storage medium U. Preferably, the inspection authentication is set for the portable storage medium U in order to prevent software that has not been authenticated from being additionally stored in the same portable storage medium U. Therefore, when the portable storage medium U for which the inspection authentication is set connects to the kiosk 100, the authentication module 160 checks inspection authentication and displays the result of the checking on a monitor provided in the kiosk 100.

The client C2 connected to the internal network N2 checks the portable storage medium U for inspection authentication, and forms the check module 11 configured to authorize the execution of the stored software. The security system according to the present invention allows the software of the external network N1 to be inspected for malicious code and to be input to the internal network N2. Accordingly, the kiosk 100 inspects/disinfects the software for malicious code and sets inspection authentication, and the check module 11 of the client C2 of the internal network N2 receives only software verified for inspection authentication and allows it to be executed through the installation module 12. It is obvious that software not verified for inspection authentication is ignored and subsequent execution is blocked. In addition, the check module 11 registers the system image received from the client C2 and determines whether the received system image matches the system image of the portable storage medium U by comparing them with each other. In other words, when the software installed in the portable storage medium U is infected with malicious code, the installation image, i.e., the system image, is changed while the sector of a stored file changes. Accordingly, the check module 11 may determine whether the portable storage medium U is infected with malicious code and whether the system images match each other. Eventually, the client C2 accurately checks the portable storage medium U inspected by the kiosk 100 and determines whether the portable storage medium U is subsequently infected with malicious code.

The kiosk 100 according to the present invention further includes a verification module 130 configured to classify software by type and verify it according to a verification process unique to each type.

The types of software input to the kiosk 100 through the portable storage medium U are various according to the format, execution program, and extension thereof. However, if various types of software are inspected for malicious code by using the same process, the inspection efficiency and reliability for each type will decrease inevitably. Accordingly, the verification module 130 identifies and classifies the type of software stored in the portable storage medium U in order to classify the type of software and inspect the software using a process suitable for the type. In this embodiment, the type of software may include a firmware type, a patch type, and a document type.

For reference, the firmware type of software is a type of microprogram configured to control a control device such as a computer, and is understood as software having hardware characteristics. The patch type of software is understood as software configured to update the Windows or other various programs. The document type of software is a file created by a word processor and has an extension such as *.hwp, *.docx, *.xlsx, *.pdf, or the like. In addition, executable files with extensions such as *.exe, *.dll, *.com, and *.bat may be classified as this type of software.

The verification of the firmware type of software is performed in such a manner that the verification module 130 analyzes the reference data set (RDS) hash set of software and whether the RDS hash set is a designated RDS hash set.

For reference, in order to increase the efficiency of digital forensic evidence data analysis, the RDS is a data set that excludes a file known as being normal and checks a specific file for the presence thereof and examines it. In other words, through the analysis of the RDS hash set, the verification module 130 classifies the software, generated by the system, fonts and an application, as code known as being normal, excludes it from analysis targets, and includes known malicious codes, such as rootkits, backdoors and exploits, and software related to specific conditions in the analysis targets.

The verification of the patch type of software is performed in such a manner that the verification module 130 checks whether the code sign of software is valid by analyzing the code sign of the software.

As is well known, a software developer produces and supplies a patch to update its software as well as its own software. Accordingly, a code sign is set for the patch so that it can be determined that the patch is normal software of the corresponding software developer. Based on this, when it is determined that the software of the portable storage medium U is a patch type, the verification module 130 checks whether a code sign has been set for the software and also checks the integrity of the set code sign.

The verification of the document type of software is performed in such a manner that the verification module 130 checks whether a designated malicious code is present by analyzing the constituent macros of the software.

As is known, a macro is a type of record made by grouping several frequently used commands into one keystroke operation, and a word processor sets a program to process the record. Accordingly, the inconvenience in which an operator repeatedly uses specific commands in a predetermined order during work using a word processor may be reduced using a macro function. Meanwhile, such macros are often circulated outside for general business purposes, and word processors such as EXCEL® are widely used for business purposes in finance, accounting, and financial sectors. Accordingly, hackers frequently and maliciously use malicious codes by installing malicious codes in macros.

Accordingly, when determining that the software of the portable storage medium U is a document type, the verification module 130 detects whether a macro is present by analyzing the format, extension, and header structure of the software. As a result of the verification, the macro-related inspection for malicious code is stopped because the possibility of infection attributable to a macro is low in the software in which a macro is not set.

In contrast, when determining that a macro is present, the verification module 130 checks whether the macro is infected by comparing the macro with information related to existing malicious codes. For reference, a macro infected with a malicious code is transformed into a specific function form, so that even when a normal macro and a malicious macro may perform the same macro function, the normal macro and the malicious macro may have different function forms. Accordingly, the verification module 130 determines whether the macro is infected by detecting a macro that is the same as the form of the macro infected with the malicious code.

The kiosk 100 according to the present invention further includes a detoxification module 150 configured to detoxify the software by performing the structural analysis, active content analysis, and software recombination of the software.

When the inspection/disinfection of the software for malicious code through the vaccine module 140 and the verification module 130 of the kiosk 100 has been completed, the detoxification module 150 detects and detoxifies malicious code omitted during the inspection/disinfection process of the vaccine module 140 and the verification module 130. To this end, the detoxification module 150 according to the present embodiment operates in the order of document format verification, document structure analysis, component extraction and verification, and reconstruction verification. More specifically, the verification module 130 analyzes the structure of the software by scanning the software, detects and analyzes the active content that is composed of an ActiveX control or script code and is included in a web page and distributed from the software, and removes the detected active content. When the analysis and the removal have been completed, the detoxification of the software is finally completed through content disarm and reconstruction (CDR).

Through the above-described process, the detoxification module 150 detoxifies the software of the portable storage medium U and completes the final inspection/disinfection for malicious code.

The kiosk 100 according to the present embodiment further includes a kiosk management module 170. The kiosk management module 170 manages the cooperative operation of the registration module 110, the memory 120, the verification module 130, the vaccine module 140, the detoxification module 150, and the authentication module 160. In addition, the kiosk management module 170 controls the kiosk 100's own operation.

The operation is now described in greater detail. The kiosk 100 according to the present embodiment includes a reader configured to check the identity of a user and a display device configured to guide the user through the overall operation of the kiosk 100. In particular, the reader is configured to read authentication media such as an identification card, a fingerprint, and an eye carried by the user. To this end, the reader is disposed to be exposed out of the housing of the kiosk 100 so that it is easily manipulated by the user. In addition, this process and guidance messages are displayed through the display device, and the user operates the kiosk 100 in response to the guidance messages. As described above, the kiosk management module 170 is configured to control the operations of the reader and display device of the kiosk 100, and the constituent modules 110 to 160, reader and display of the kiosk 100 operate according to common management processes.

Meanwhile, the malicious code inspection/disinfection of the vaccine module 140, the verification module 130, and the detoxification module 150 described above may have limitations, and thus the inspection/disinfection process of the kiosk 100 is performed in parallel with that of a separate cloud device 200. In this case, the communication between the kiosk 100 and the cloud device 200 is performed through the external network N1, and communication technology using a virtual private network (VPN) method may be applied.

The cloud device 200 according to the present embodiment includes: a software management module 210 configured to analyze the software of a portable storage medium U connected to the kiosk 100 and search for corresponding reference information; a history registration module 220 configured to register and manage history information based on changes in the specifications of the software; and a comparison and analysis module 230 configured to detect a change equal to or larger than a reference value by comparing the specifications of the software with at least one of the reference information and the history information and provide notification of the change equal to or larger than the reference value.

The individual components are now described in greater detail. The software management module 210 identifies a registration number registered in the cloud device 200, the type of software (product), the name of the software, a current version, memory, a constructed compiler, the number of files, capacity, an analysis date, the types and number of link URLs, and number of IPs by analyzing the software introduced from the kiosk 100, and sets them as reference information. To this end, the software management module 210 registers the software in advance, and, when new software is introduced, registers and stores it in the cloud device 200 according to regulations.

The history registration module 220 checks for a change in the specifications of the software detected by the software management module 210 and registers it as history information. In other words, a change in the specifications of software is checked for every time the software is introduced and recorded as accumulated data so that the change can be clearly found. Accordingly, when the software is a patch, it may be possible to determine whether the patch is normal based on the history information by determining a change in the version of the patch, a change in the structure of memory, and the presence of a new compiler whose existing history information is not found.

The comparison and analysis module 230 compares the specifications of newly introduced software with the corresponding reference information of the software determined by the software management module 210 or compares the specifications of newly introduced software with the history information of the history registration module 220, and, when it is determined that there a different equal to or larger than a reference value, notifies a designated target of the difference.

In addition, when determining that a change in the size of a constituent file, a change in the use of memory, the configuration of a new link address, the generation of a new executable file, a change in the version of a file, a change in the structure of memory is equal to or larger than a reference value, the comparison and analysis module 230 notifies the designated target of the change.

Furthermore, when the difference between a virtual size and the size of raw data for a section is equal to or larger than a reference value in the constituent code of the software of the portable storage medium U, when the entropy for a section is analyzed and calculated in the constituent code of the software of the portable storage medium U and a calculated value is equal to or larger than a reference value, or when the signature of a designated packer is searched for in the constituent code of the software of the portable storage medium U and the execution of the packer is detected, the comparison and analysis module 230 provides notification thereof to the designated target.

In addition, when, as a result of the comparison of the specifications of the software of the portable storage medium U with the history information, at least one of a keyboard or mouse hooking code, an access target elevation code for the stored information of the client, an asynchronous procedure call (APC) injection code, a DLL injection code, an execution process replacement code, and a service addition code is extracted from the software, the comparison and analysis module 230 provides notification thereof to the designated target. For reference, APC injection is also referred to as an asynchronous procedure call, and is executed by a power cell executed by an invoke-expression function. Asynchronous procedure call injection is used as a means for infection with malicious code because it first allocates memory for a malicious DLL along with VirtualAllocEx and copies the malicious DLL to it. In addition, DLL injection is a technology that executes code by forcibly loading a DLL in the address space of another process, and is used as another means for infection with malicious code.

As described above, when the change equal to or larger than the reference value with respect to the reference information is found in the software, it is estimated that a function other than its own function has been added to the software, so that the software may be suspected of being infected with malicious code. Accordingly, the comparison and analysis module 230 of the cloud device 200 may notify the designated target of the software whose change is determined to be equal to or larger than the reference value so that inspection is performed. In this case, the designated target may be a software developer or a professional program engineer who is a software originator. Accordingly, information about the inspection of the software by the designated target may be transmitted to the kiosk 100 and output through the display device, or may be transmitted to a related person via a communication medium such as e-mail, MMS, and SMS.

Figure 3:
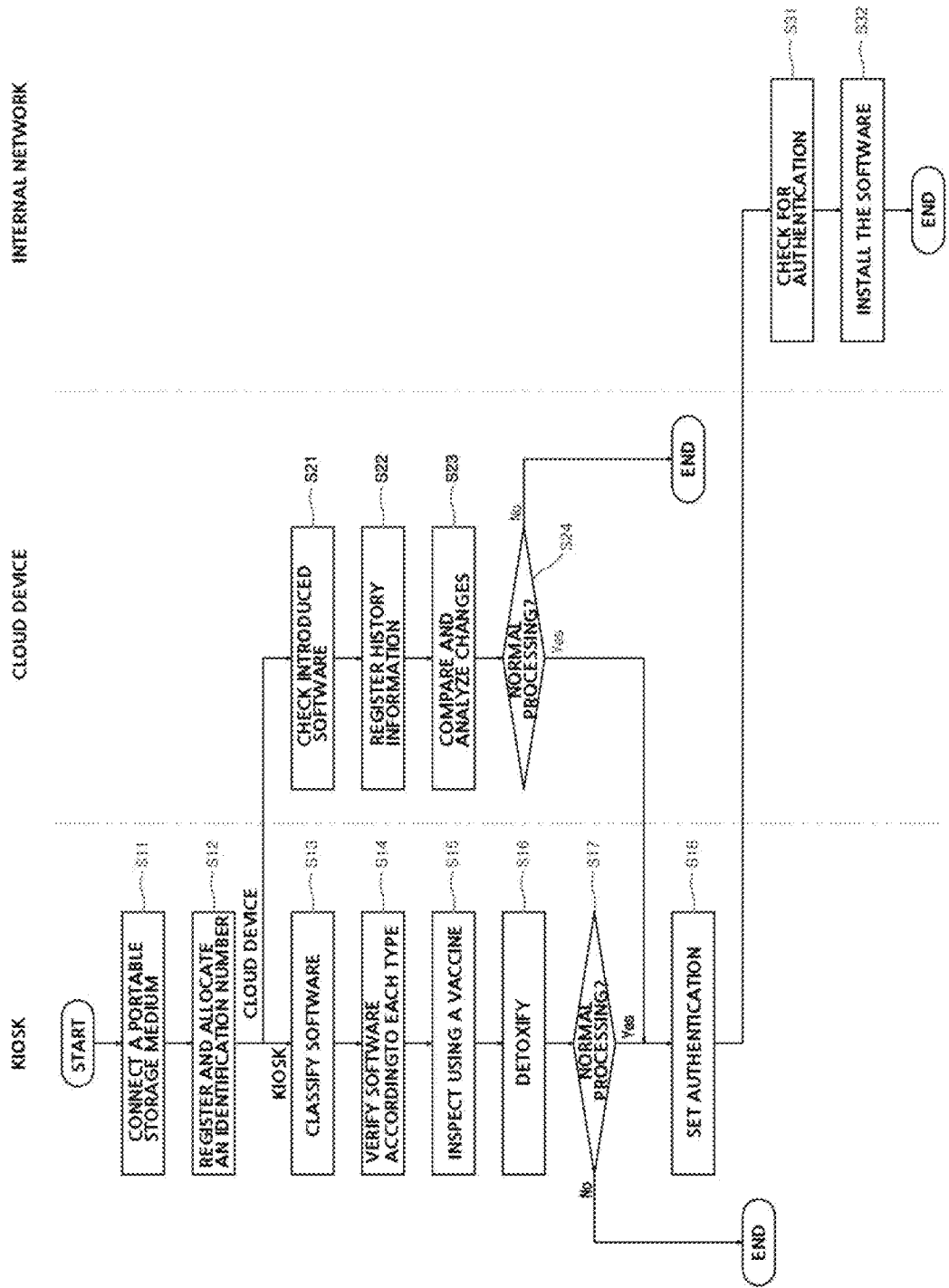
FIG. 3 is a flowchart sequentially showing a security method based on a security system for software to be input according to the present invention.
Figure 4:
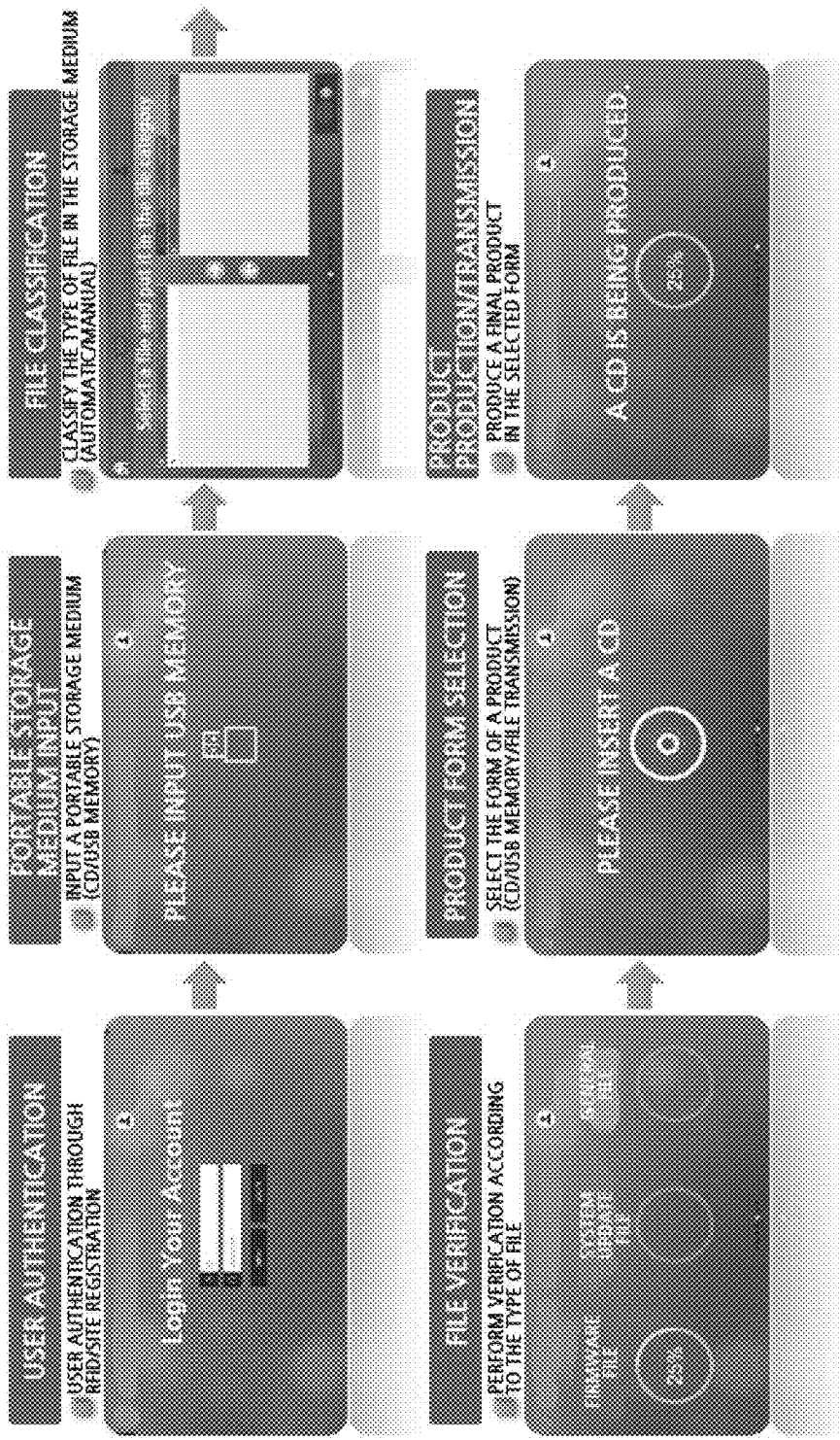
FIG. 4 is an image sequentially showing images of a software inspection/disinfection process displayed on the kiosk of the security system for software to be input according to the present invention.
Figure 5:
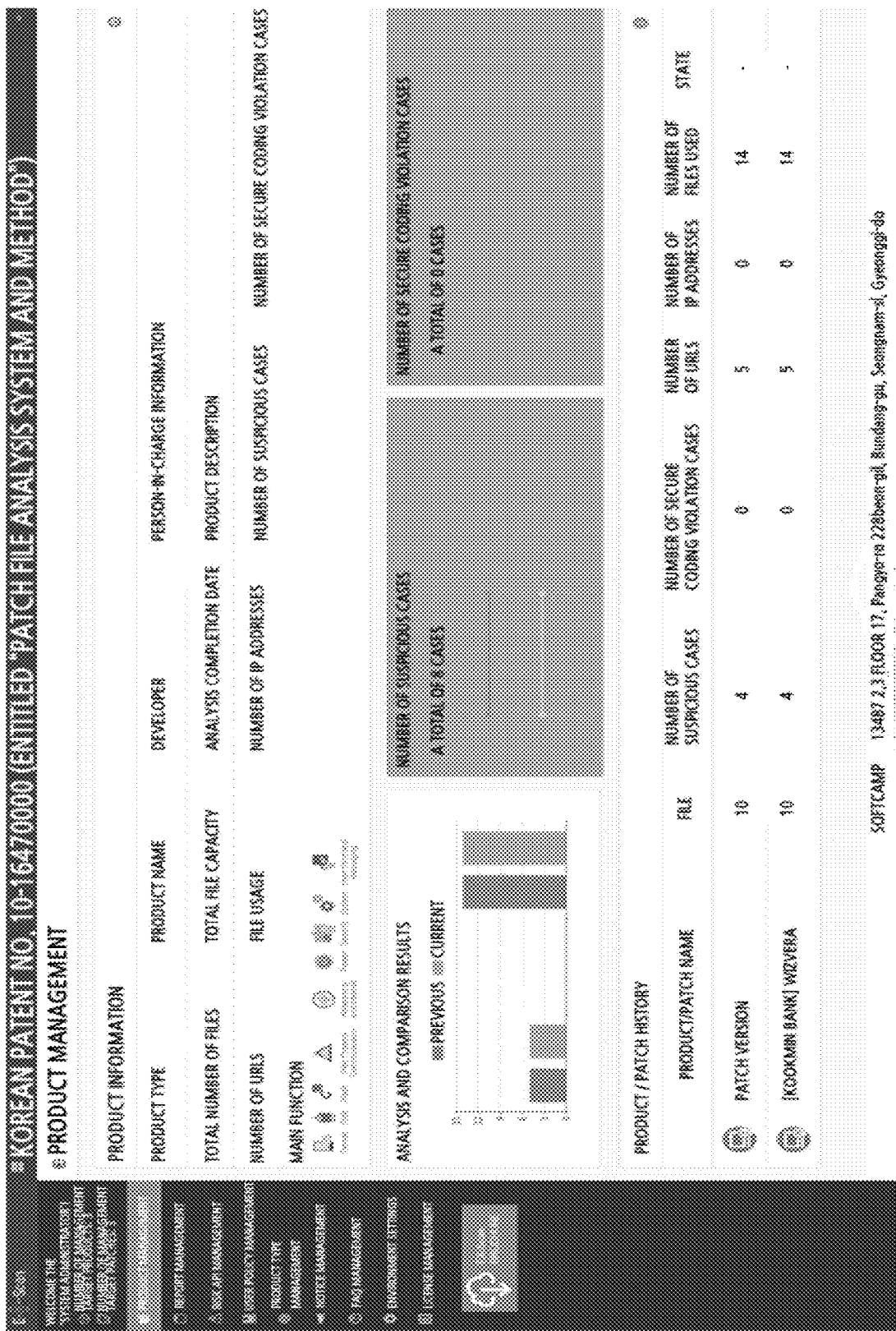
FIGS. 5 and 6 are images showing a simulation of an inspection/disinfection service processed in the cloud device of the security system for software to be input according to the present invention.
Figure 6:
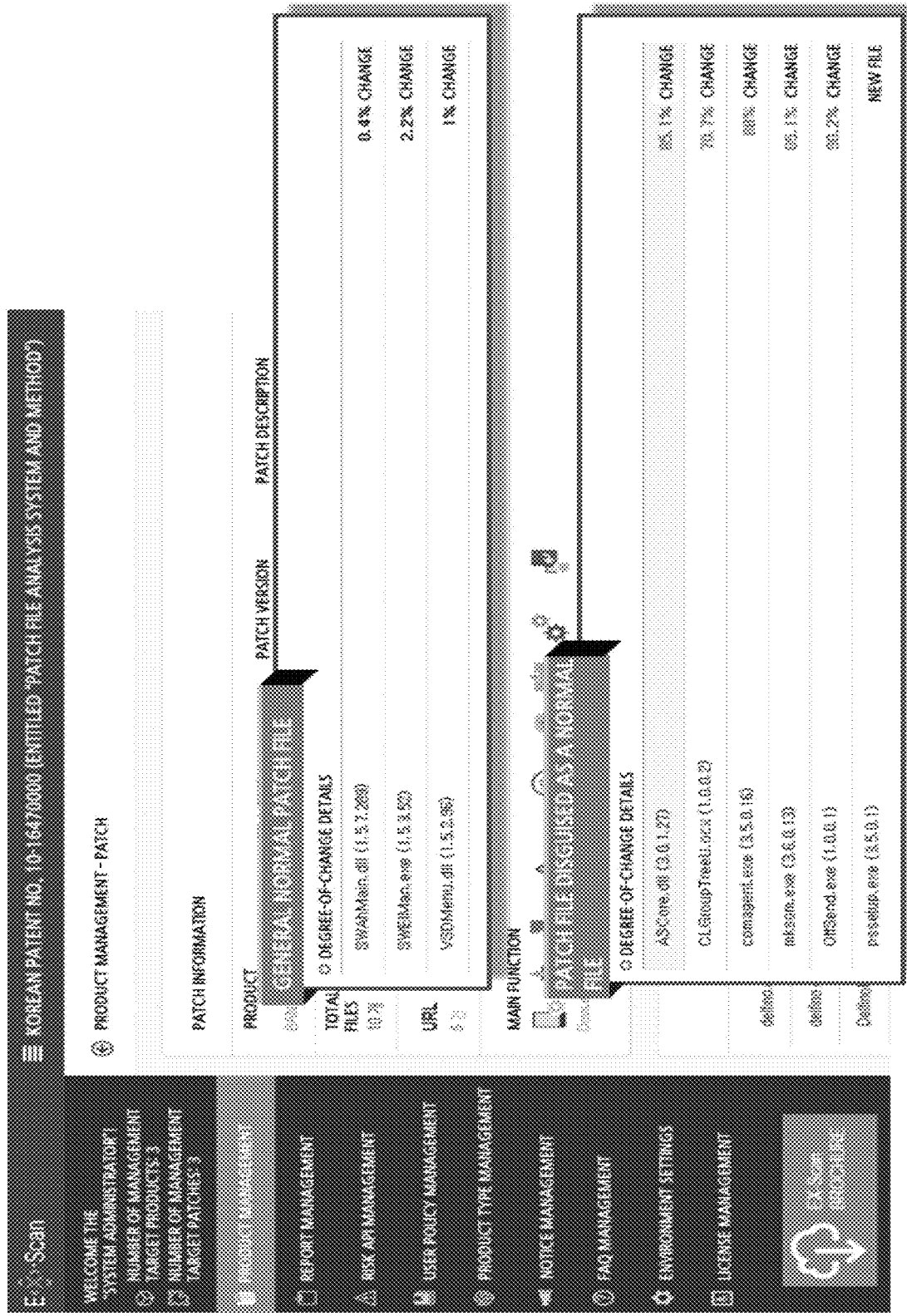

FIG. 3 is a flowchart sequentially showing a security method based on an security system for software to be input according to the present invention; FIG. 4 is an image sequentially showing images of a software inspection/disinfection process displayed on the kiosk of the security system for software to be input according to the present invention; and FIGS. 5 and 6 are images showing a simulation of an inspection/disinfection service processed in the cloud device of the security system for software to be input according to the present invention.

Referring to FIGS. 1 to 6, the security system according to the present invention operates according to the following process:

S11: Portable Storage Medium Connection Step

A user connects the portable storage medium U, storing software to be introduced into the internal network N2, to the kiosk 100. For the purpose of the connection, the kiosk 100 according to the present embodiment performs user authentication and inputs the portable storage medium U to the kiosk 100 in a hardware and software fashion, as shown in FIG. 4.

Since technology for the user authentication, technology for the connection of the portable storage medium U, and technology for the input of stored software are already known technologies, descriptions thereof will be omitted here.

S12: Identification Number Allocation Step

The registration module 110 allocates an identification number for the identification of the software input at the connection step. Based on this, the software is identified and registered. In addition, the registration module 110 takes a snapshot of the system image of the portable storage medium U connected to the kiosk 100, registers it in association with the identification number, and transmits it so that it can be registered with the client C2.

As is known, the system image is the installation image of the software stored in the portable storage medium U, and is the content of a disk drive obtained by dividing and then copying a stored file in a sector-to-sector fashion. Accordingly, when there is a change in the installation file of the portable storage medium U or a new file is additionally stored, a change occurs in the system image.

The software to which the identification number has been allocated is subjected to a subsequent inspection/disinfection process in the kiosk 100, is transmitted to the cloud device 200 and subjected to a subsequent inspection/disinfection process, or is subjected to a subsequent inspection/disinfection process in both the kiosk 100 and the cloud device 200 in parallel.

S13: Software Classification Step

The software to which an identification number is allocated is classified by the verification module 130 according to the type thereof. As described above, the types of software are various according to the format, execution program, or extension thereof, or the like, and the verification module 130 classifies the software according to designated criteria.

S14: Per-Software Verification Step

The verification module 130 continues the verification of the classified software according to the corresponding type. As described above, the software according to the present embodiment may be classified as any one of a firmware type, a patch type, and a document type. For the individual types of software, an RDS hash set check is performed for the firmware type of software, code sign verification is performed for the patch type of software, and verification is performed through macro detection and analysis for the document type of software.

For reference, the kiosk 100 outputs the file verification process as a simulation, as shown in FIG. 5, so that a user can be aware of the current status of the process.

S15: Vaccine Inspection Step

The vaccine module 140 checks whether the software has been infected with malicious code and then disinfects the software by using a conventional vaccine program.

For reference, verification technology and vaccine technology are not necessarily performed according to the above-described order, but the vaccine technology may be applied before the verification technology if necessary.

S16: Detoxification Step

The detoxification module 150 sequentially performs software format verification, document structure analysis, component extraction and verification, and reconstruction and verification by using software CDR processing technology.

S17: Normal Processing Checking Step

When the above-described inspection/disinfection process has been completed and it is determined that the software is normal, a subsequent process is performed. However, when a problem occurs in part of the overall inspection/disinfection process, a subsequent inspection/disinfection process is stopped and notification of the corresponding information is provided to a user.

S21: Introduced Software Verification Step

Meanwhile, the software management module 210 checks the specifications of the software introduced from the kiosk 100, and outputs it as shown in FIG. 5. In this case, when unregistered software is introduced, the software management module 210 registers the corresponding software according to a designated procedure, and sets the specifications of the software as reference information.

S22: History Information Registration Step

The history registration module 220 checks the specifications of the software identified by the software management module 210, and registers them as history information.

For reference, the history information includes specifications found in the reference information as well as specifications not found in the reference information. In other words, when a file that cannot be found in the reference information is identified among the specifications of the introduced software, it is added as history information.

S23: Change Comparison and Analysis Step

The comparison and analysis module 230 compares the reference information and the history information with each other. As shown in FIG. 6, when a difference equal to or larger than a reference value is identified, a specification such as a new file or a link address that is not found in the reference information is identified, a change in the memory structure is identified, or a code for infection with a malicious code is identified, notification of the corresponding information is provided.

S24: Normal Processing Checking Step

When, as a result of the inspection of the comparison and analysis module 230, it is determined that the software is normal, notification thereof is provided to the kiosk. In contrast, when it is determined that the software is abnormal, there is transmitted notification refusing to introduce the software into the designated target or internal network N2.

S18: Authentication Setting Step

When, as a result of the inspection of the kiosk 100 and the cloud device 200, it is determined that the software has integrity, the authentication module 160 sets inspection authentication for the corresponding software or portable storage medium U, and allows the corresponding software or portable storage medium U to connect to the client C2 of the internal network N2.

In the present embodiment, the authentication module 160 makes it possible to transmit the inspected software via the portable storage medium U or online and to produce and transmit the software as a product.

S32: Authentication Checking Step

The check module 11 of the client C2 or S2 determines whether the software is safe by checking the inspection authentication of the portable storage medium U connected offline, and determines whether a subsequent infection has been made by checking whether the system image of the portable storage medium U and the system image registered as the portable storage medium U match each other.

When the inspection authentication of the portable storage medium U is checked and it is determined that the system images match each other, the check module 11 finally determines that the currently connected portable storage medium U and the software are safe, and the installation module 12 stores and installs the software in a designated space of the internal network N2.

According to the present invention, the communication of an internal network with the outside is blocked such that software cannot be input through an external network, and the safety of software to be input to the internal network is secured through the kiosk and the cloud device. Accordingly, the introduction of malicious code from the external network is fundamentally blocked, and there is the effect of establishing a safe software installation environment for the internal network to the external network.

Although the above detailed description of the present invention has been described with reference to the preferred embodiments of the present invention, it will be understood by those of ordinary skill in the art to which the present invention pertains that various modifications and changes may be made to the present invention without departing from the technical spirit and scope of the present invention defined in the following claims to be described later.

What is claimed is:

1. A security system for software to be input to a closed internal network, the security system comprising:
    a kiosk comprising a registration device configured to read stored software of a connected portable storage medium, a vaccine module configured to detect malicious code in the software, and an authentication module configured to set inspection authentication for the portable storage medium whose software has been inspected for malicious code; and
    a client comprising a check module configured to check the portable storage medium for inspection authentication and authorize execution of the stored software;
    wherein the registration device stores a system image of the portable storage medium and transmits the system image to the client; and
    wherein the check module registers the system image received from the kiosk and determines whether the registered system image and a system image of a portable storage medium connected to the client match each other by comparing them.

2. The security system of claim 1, wherein the kiosk further comprises at least one of a verification module configured to classify software by type and verify the software according to a verification process unique to each type and a detoxification module configured to detoxify the software by performing structural analysis, active content analysis, and software recombination of the software.

3. The security system of claim 2, wherein the verification module classifies the software as at least one of a firmware type, a patch type, and a document type.

4. The security system of claim 2, wherein:
    the verification of a firmware type of software is performed in such a manner that the verification module analyzes a reference data set (RDS) hash set of the software and whether the RDS hash set is a designated RDS hash set;
    the verification of a patch type of software is performed in such a manner that the verification module checks whether a code sign of the software is valid by analyzing the code sign of the software; and
    the verification of a document type of software is performed in such a manner that the verification module checks whether a designated malicious code is present by analyzing constituent macros of the software.

5. The security system of claim 1, further comprising a cloud device, comprising: a software management module configured to analyze the software of the portable storage medium connected to the kiosk and search for corresponding reference information; a history registration module configured to register and manage history information based on changes in specifications of the software; and a comparison and analysis module configured to detect a change equal to or larger than a reference value by comparing the specifications of the software with at least one of the reference information and the history information and provide notification of the change equal to or larger than the reference value.

6. The security system of claim 5, wherein when, as a result of the comparison of the specifications of the software of the portable storage medium with the history information, at least one of a keyboard or mouse hooking code, an access target elevation code for stored information of the client, an asynchronous procedure call (APC) injection code, a DLL injection code, an execution process replacement code, and a service addition code is extracted from the software, the comparison and analysis module provides notification thereof to a designated target.

7. The security system of claim 5, wherein the comparison and analysis module provides notification to the designated target when a difference between a virtual size and a size of raw data for a section is equal to or larger than a reference value in constituent code of the software of the portable storage medium, when entropy for a section is analyzed and calculated in the constituent code of the software of the portable storage medium and a calculated value is equal to or larger than a reference value, or when a signature of a designated packer is searched for in the constituent code of the software of the portable storage medium and execution of the packer is detected.

8. The security system of claim 1, wherein the kiosk is interfaced such that it can perform network communication by using a virtual private network (VPN) method.

\* \* \* \* \*